United States Patent [19]
Liebhart

[11] Patent Number: 5,477,956
[45] Date of Patent: Dec. 26, 1995

[54] VESSEL PROCESSING SYSTEM AND PROCESS

[75] Inventor: Dana J. Liebhart, Cuyahoga Falls, Ohio

[73] Assignee: Automated Label Systems Company, Twinsburg, Ohio

[21] Appl. No.: 232,753

[22] Filed: Apr. 22, 1994

[51] Int. Cl.⁶ .................................................... B65G 47/26
[52] U.S. Cl. .................... 198/459.4; 198/346.2; 198/467.1
[58] Field of Search ................... 198/346.2, 459, 198/461, 467.1, 480.1, 577, 579, 817, 661, 459.4

[56] References Cited

U.S. PATENT DOCUMENTS

| | | |
|---|---|---|
| 1,256,070 | 2/1918 | Stake . |
| 1,828,168 | 10/1931 | Ayars ................................. 198/467.1 |
| 2,630,904 | 3/1953 | Bozek . |
| 2,854,125 | 9/1958 | Johnson . |
| 3,187,878 | 6/1965 | Harrison et al. . |
| 3,565,235 | 2/1971 | Brown et al. . |
| 3,650,374 | 3/1972 | Mansfield ............................. 198/661 |
| 4,252,230 | 2/1981 | Eriksson ............................. 198/346.2 |
| 4,660,708 | 4/1987 | Willerding . |
| 4,709,800 | 12/1987 | Olsen . |
| 4,789,016 | 12/1988 | Mihail ................................ 198/467.1 |
| 4,852,717 | 8/1989 | Ross et al. . |
| 5,197,586 | 3/1993 | Sola . |

*Primary Examiner*—Joseph E. Valenza
*Attorney, Agent, or Firm*—Watts, Hoffmann, Fisher & Heinke Co.

[57] ABSTRACT

A conveyor system for use with a vessel processing machine, such as a bottle labeler or delabeler is disclosed. The system includes a supply conveyor which feeds bottles in in-line, juxtaposed relationship to a vessel accelerating mechanism at a transfer station. At the station the speed of the vessels is accelerated and they are separated as they pass onto a delivery conveyor from which they are transferred to the processing machine. Processed bottles are returned to the delivery conveyor and transported to a decelerating mechanism at an exit transfer station. There the speed of the bottles is reduced and they are returned to juxtaposed, in-line relationship as they transfer to an exit conveyor for transport to an output for subsequent processing. The disclosure also includes a process for transporting bottles in-line and juxtaposed, accelerating the bottles into spaced relationship at speeds and spacing appropriate for supply to a processing machine, receiving processed bottles from the processing machine, transporting them to a decelerating mechanism where they are returned to their juxtaposed, in-line relationship and thereafter fed to an output end of an exit conveyor for further processing.

14 Claims, 4 Drawing Sheets

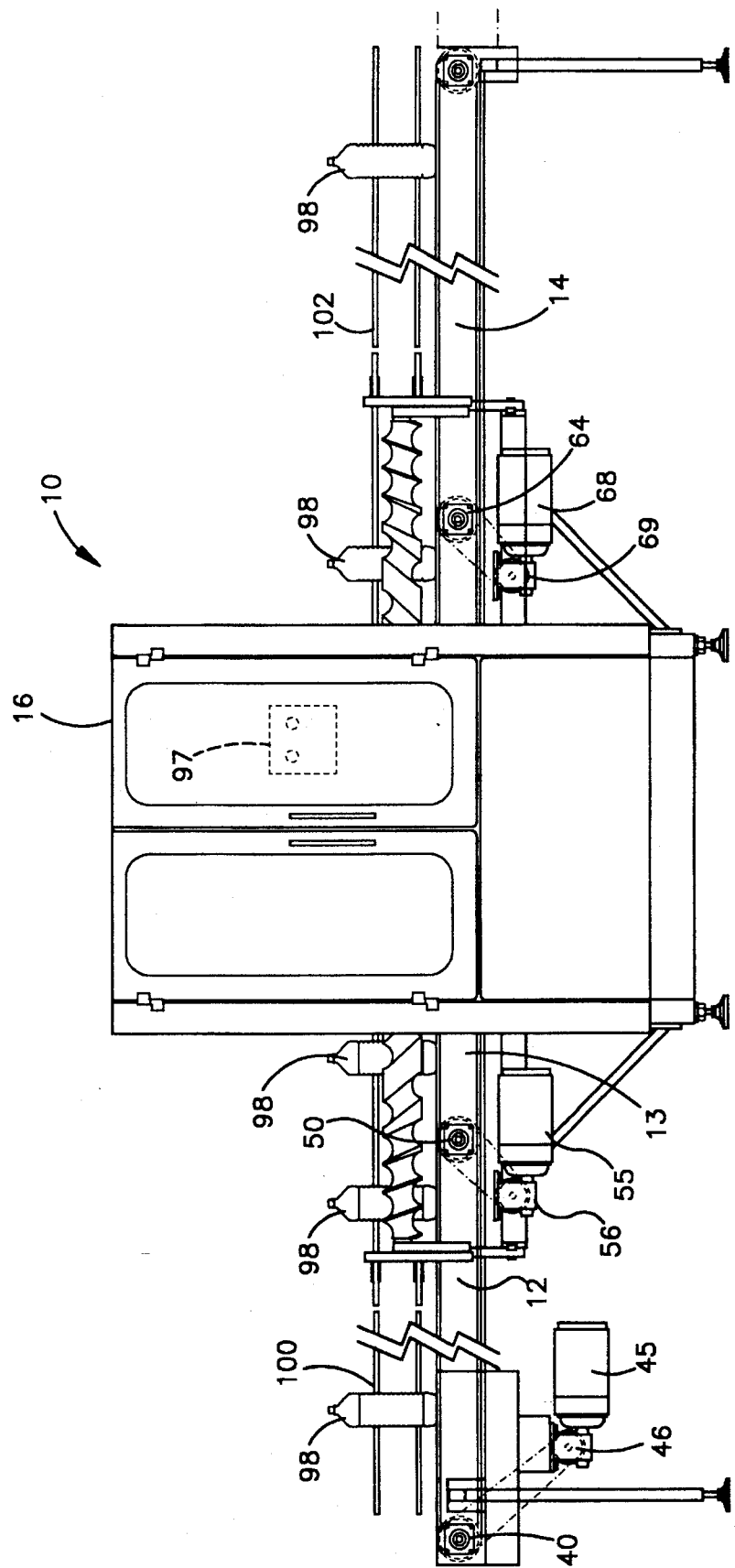

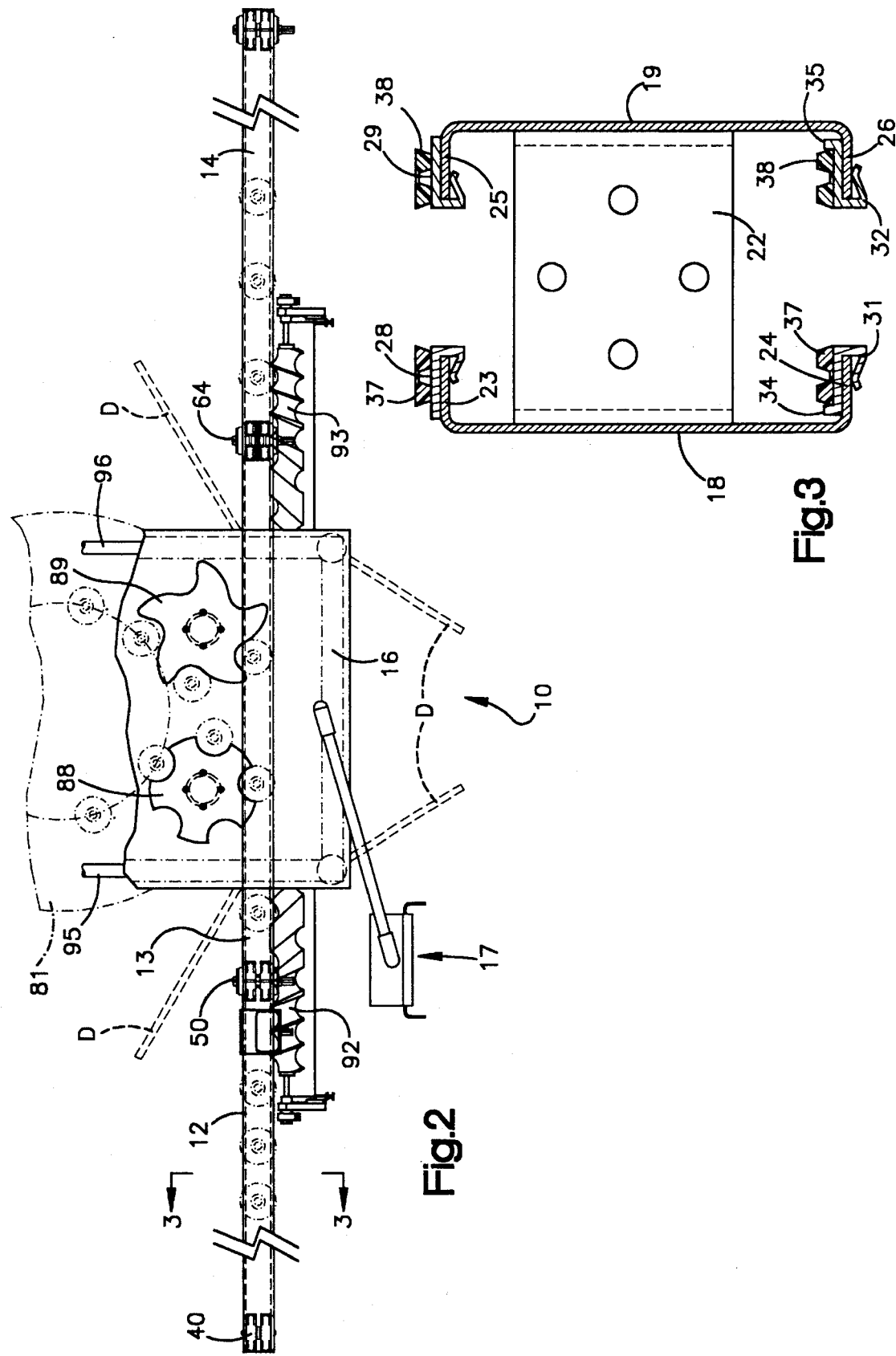

VESSEL PROCESSING SYSTEM AND PROCESS

FIELD OF INVENTION

This invention relates to vessel processing mechanisms and more particularly to a conveyor system which is especially suited for delivering vessels to and conveying vessels from vessel processing machines such as labeling and delabeling machines and a method of transporting vessels.

BACKGROUND

Tubular, plastic bottle labels which surround bottles and are maintained in position by tension of the labels are enjoying increasing popularity. A number of machines have been developed for applying such labels to vessels, the most recent of which is a high speed labeler which is described and claimed in copending application 07/789,257, filed Nov. 7, 1991, entitled HIGH SPEED SLEEVER and assigned to Automated Label Systems Company, the assignee of this patent (the HIGH SPEED LABELER case).

Reusable, plastic bottles are also increasing in popularity. Some segments of the beverage industry have commenced to use standardized bottles, so that bottlers in a standardized industry segment are able to reuse returned bottles without the need for the expense of sorting reusable bottles and returning them to a particular bottler.

One of the many reasons for increased popularity of tubular labels is that they can be readily removed from bottles facilitating reuse of the bottles or recycling of the bottle materials as well as recycling of the label materials.

A high speed delabeling machine that has also been developed is described and claimed in copending application 07/941,388, filed on Sep. 8, 1992, entitled DELABELER AND METHOD and also assigned to Automated Label Systems Company (the HIGH SPEED DELABELER case). With both the high speed labeler and the delabeler, bottles are conveyed inline by a supply section of a conveyor. A variable pitch screw engages bottles as they approach the processing machine and accelerates them to provide appropriate spacing and timing for supply of the bottles to work stations on a rotary turret. Upon exit from the processing machine, the bottles are transferred to an exit conveyor which receives them at spacings corresponding to the spacings achieved by the variable pitch screw.

With these prior machines one long conveyor belt is provided which operates at speeds appropriate for supply of bottles to the processing machine. As they approach the variable pitch screw, their engagement with bottles that precedes them retards their motion and they slip relative to the belt. On exit they are spaced and there is no such engagement to effect the retarding, so the bottles are not only spaced, but transported at speeds which are faster than they need be. Because of their spacings and speed, they are more susceptible to falling over than they should be and further processing is made somewhat difficult by their spacing.

Accordingly, there exits a need for returning the bottles to an inline, touching relationship corresponding to their relationship on the supply section of the conveyor once the bottles have been through the processing machine.

SUMMARY OF THE INVENTION

With an apparatus embodying this invention, a three section, multiple speed conveyor system is provided. A supply conveyor is provided which feeds bottles in line and juxtaposed at a relatively slow feed rate. Bottles are separated and accelerated by a variable pitch supply screw and then conveyed in spaced relationship by a delivery conveyor at relatively higher speed to a processing machine supply station. On exit from the processing machine vessels are decelerated by a variable pitch screw of reverse pitch with respect to the supply screw to slow the bottles to speeds corresponding to the supply conveyor and bring them once more into an in line, juxtaposed relationship. They are thence transported by the exit conveyor to an output end from which the bottles are delivered for further processing.

In the preferred and disclosed embodiment, the supply and exit conveyors each include a pair of opposed channel members connected in spaced relationship. With the supply conveyor a belt drive is carried by the channels at a location near an input end. The supply belt drive includes a spaced pair of motor driven sheaves respectively engaging a pair of supply conveyor belts. A spaced pair of axially aligned supply idler sheaves are journaled for rotation near a transfer end of the supply conveyor. The supply conveyors belts are respectively reeved over longitudinally aligned ones of the supply drive and idler sheaves. The belts are supportively trained along supply channel flanges for transport of bottles from the input to the transfer end.

The exit conveyor is similarly constructed with a pair of axially aligned driven sheaves mounted near a pickup end, a pair of axially aligned exit idler sheaves near an output end of the exit conveyor, and a pair of exit conveyor belts respectively reeved over longitudinally aligned ones of the exit drive and idler sheaves.

The delivery conveyor has a single belt reeved around a delivery drive sheave at a transfer station located at the transfer end of the supply conveyor and an idler sheave at an exit transfer station at the pickup end of the exit conveyor. The delivery conveyor drive sheave is interposed between and axially aligned with the supply conveyor idler sheaves while the delivery conveyor idler sheave is interposed between and axially aligned with the exit conveyor drive sheaves.

Drive motors are respectively connected through power trains to the supply, delivery and exit drive sheaves. The motors are coupled to a common speed control so that the speeds of all three motors can be adjusted concurrently while their speed ratios are maintained constant through their respective drive trains.

Vessel speed accelerating and decelerating mechanisms are respectively positioned near the supply transfer station and the exit transfer station. These mechanisms are variable pitch screws which are oppositely oriented. The supply mechanism functions to accelerate vessels from the supply conveyor for appropriate rates of travel and spacing for transfer from the delivery conveyor to a processing machine, preferably in the form of either a labeling or a delabeling machine. The decelerating mechanism receives vessels from the delivery conveyor, slowing them and bringing them into juxtaposed relationship for transport along the exit conveyor at speeds corresponding to the supply conveyor speeds.

Preferably the vessel processing machine used in combination with the novel and improved conveyor system of this invention, is a turret type machine with multiple work stations, such as those machines disclosed in the HIGH SPEED LABELER and HIGH SPEED DELABELER cases.

Accordingly, the objects of this invention are to provide a novel and improved vessel conveyor system and a method for supplying vessels to and removing vessels from a vessel processing machine.

BRIEF DESCRIPTION OF THE DRAWINGS

In the Drawings FIG. 1 is a front elevational, longitudinally foreshortened, view of the conveyor system of this invention;

FIG. 2 is a foreshortened, top plan view of the system of FIG. 1, showing a fragmentary portion of a vessel processing machine;

FIG. 3 is an enlarged, cross sectional view of the supply conveyor as seen from a plane indicated by the line 3—3 of FIG. 2;

DESCRIPTION OF THE PREFERRED EMBODIMENT

Figure 4:
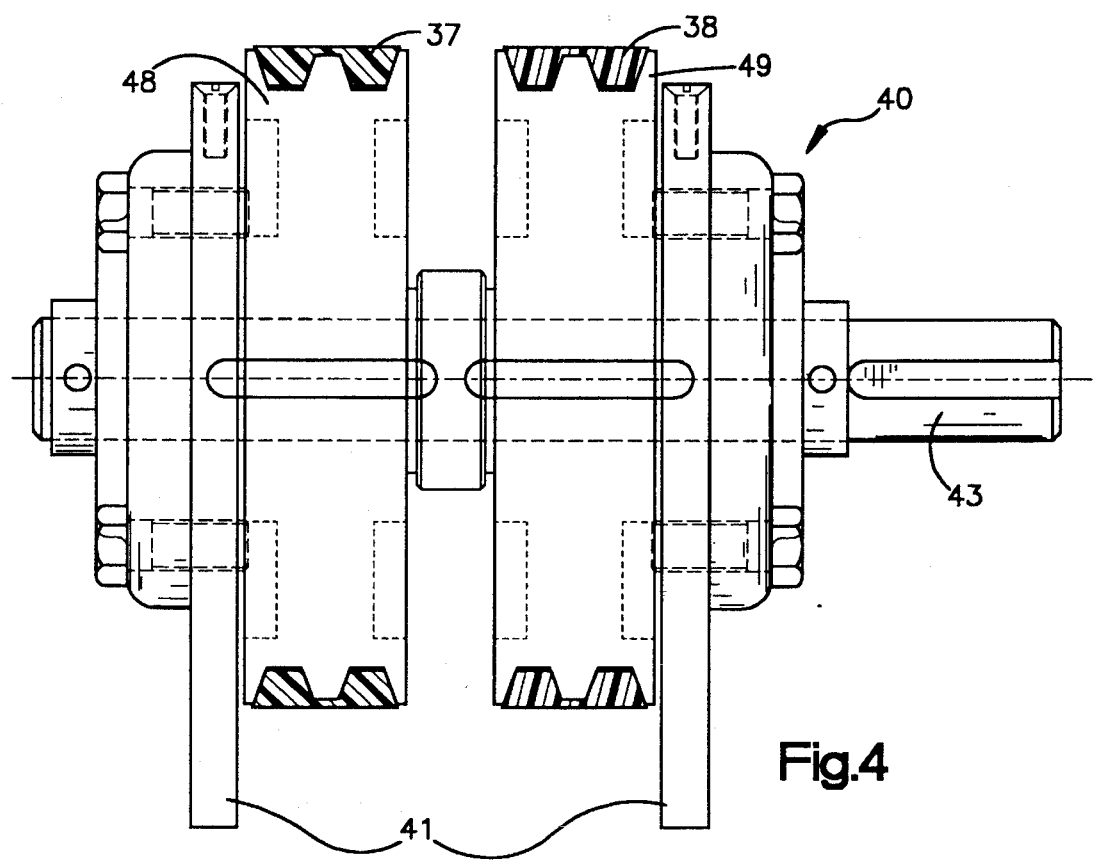
FIG. 4 is an elevational view on an enlarged scale, partially in section, of the supply conveyor drive.

Referring to the drawings and FIGS. 1 and 2 in particular, the improved conveyor system is shown generally at 10. The conveyor system includes supply, delivery and exit conveyors 12, 13, 14. The system also includes a control cabinet 16 which houses various electrical components and controls for the system. The cabinet includes front and back access doors shown open in phantom at D in FIG. 2. The cabinet supports a projecting operator control station 17, FIG. 2.

The supply and exit conveyors are quite similar in construction and accordingly only the supply conveyor will be described in detail. Referring to FIG. 3, the supply conveyor 12 includes a pair of opposed channels 18, 19 secured together in spaced relationship as by a spacer 22. The channels respectively include upper and lower inturned flanges 23, 24, 25, 26. The upper flanges 23, 25 respectively carry press connected, upper belt slides 28, 29. Lower belt slides 31, 32 are respectively frictionally connected to the lower inturned flanges 24, 26. The lower belt slides differ from the upper in having upturned end sections 34, 35 at their outboard ends to inhibit sliding engagement of supply conveyor belts 37, 38 with the channels 18, 19.

Referring now to FIG. 4, a supply conveyor drive is shown generally at 40. The supply conveyor drive 40 is positioned at an input end of the supply conveyor 12, which is the left hand end as viewed in FIGS. 1 and 2. The drive 40 includes mounting plates 41 which are fixed to the channels 18 and 19 respectively. A drive shaft 43 is rotatably supported by the plates 41. The drive shaft 43 is drivingly connected to a supply conveyor drive motor 45, FIG. 1, through a drive train 46 which provides appropriate speed reduction. Supply conveyor sheaves 48, 49 are keyed to the drive shaft 43 for transmission of belt driving force from the shaft 43 to the supply conveyor belts 37, 38.

Figure 5:
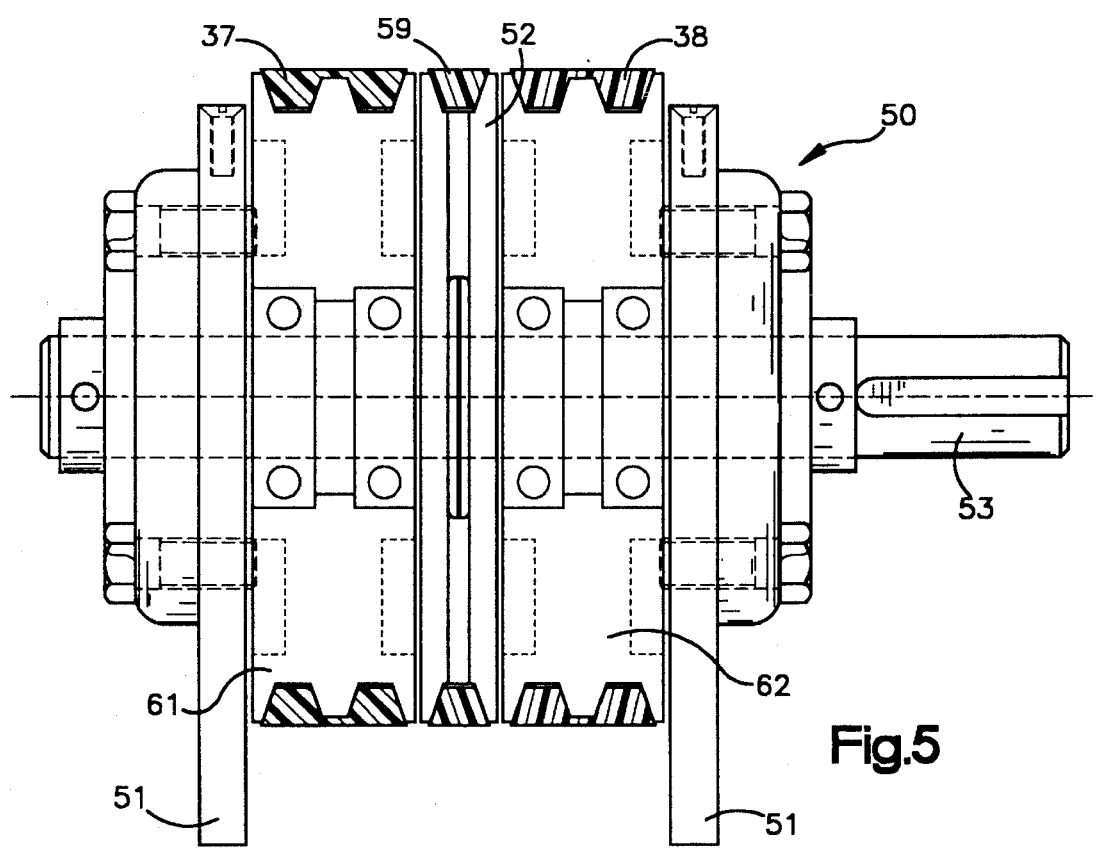
FIG. 5 is an elevational partially sectioned view on the scale of FIG. 4 showing the supply conveyor idler sheaves and the delivery conveyor drive sheave.

Referring now to FIG. 5, a delivery conveyor drive is shown generally at 50. The delivery drive 50 includes side plates 51 which are fixed to channels 18, 19. A delivery conveyor drive shaft 53 is rotatably carried by the side plates 51. A delivery conveyor drive motor 55 is drivingly connected to the drive shaft 53 through a drive train 56 which, like the drive train 46, provides appropriate speed reduction.

A delivery conveyor drive sheave 58 is drivingly carried by the drive shaft 53. The delivery conveyor drive locates a supply transfer station at the right hand end, as viewed in FIGS. 1 and 2, of the supply conveyor 12. The delivery conveyor drive sheave 58 is centrally located, axially speaking, between the side plates 51. A delivery conveyor belt 59 is reeved around the sheave 58 in driving connection.

Supply conveyor idler sheaves 61, 62 are journaled on the transfer conveyor drive shaft for free rotation about the shaft. The supply conveyor belts 37, 38 are respectively trained around the idler sheaves 61, 62, so that the belts are trained along inturned flanges 23–26 and tensioned between the supply conveyor drive and idler sheaves 48, 49, 61, 62. Thus, the single delivery conveyor belt 59 at its input end is interposed between the supply belts 37, 38.

Figure 6:
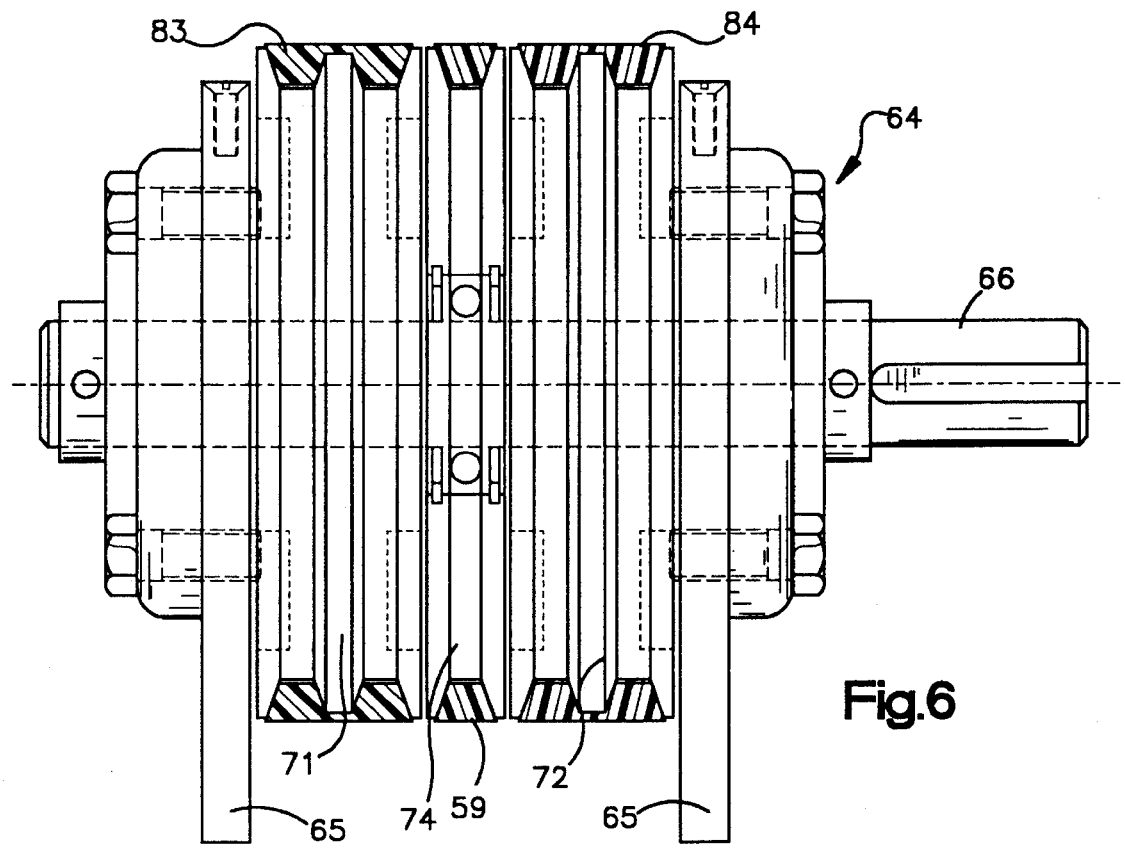
FIG. 6 is an elevational, partly sectioned view of the exit conveyor drive showing the delivery conveyor idler sheave; and, FIG. 7 is an elevational, partially sectioned view of the exit conveyor idler sheaves.

Referring now to FIG. 6, an exit conveyor drive 64 is provided. The exit, conveyor drive 64 locates an exit transfer station and is positioned at the left hand end of the exit conveyor 14, as seen in FIGS. 1 and 2. Like the other drives, the exit conveyor drive 64 has side plates 65 which are secured to exit conveyor channels corresponding to the supply conveyors channels 18, 19. An exit conveyor drive shaft 66 is journaled in the side plates 65 for relative rotation. An exit conveyor drive motor 68 is drivingly connected through a speed reducing drive train 69 to the exit drive shaft 66. Exit conveyor drive sheaves 71, 72 are drivingly connected to the shaft 66. A delivery conveyor idler sheave 74 is interposed between the exist conveyor drive sheaves 71, 72 and journaled on the shaft 66 for free relative rotation. The delivery conveyor belt is trained around the idler sheave 74, such that delivery conveyor belt 74 is stretched between the drive sheave 58 and the idler sheave 74.

Figure 7:
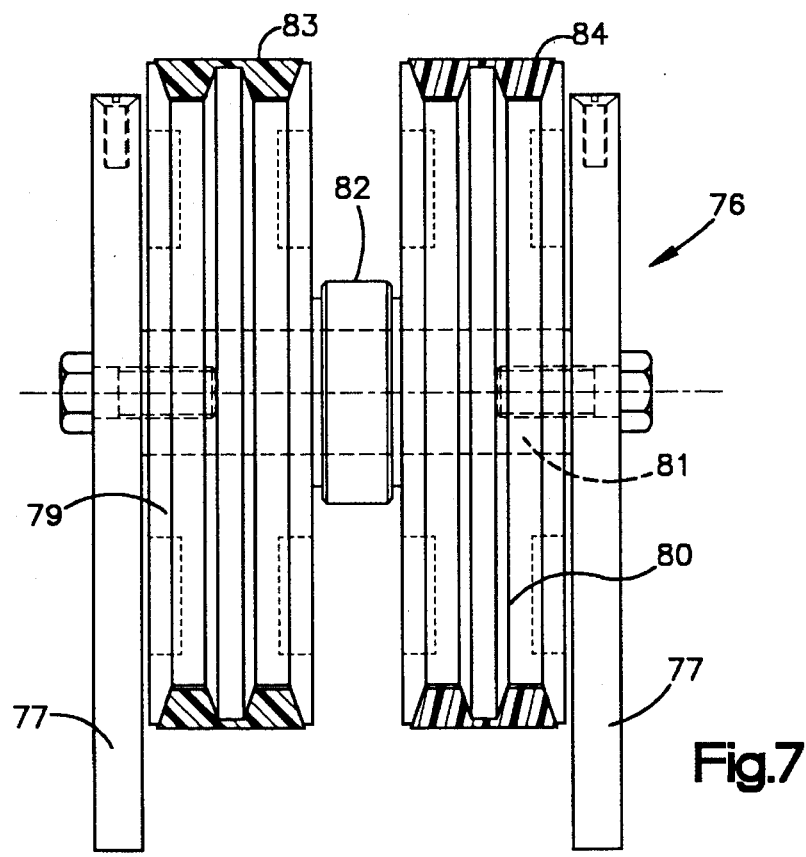

Referring to FIG. 7, an exit conveyor idler assembly is shown generally at 76. The exit idler assembly 76 includes side plates 77 fixed to the exit conveyor channels. Exit conveyor idler sheaves 79, 80 are rotatively mounted on a shaft 81 that is fixed between the plates 77. A thrust bearing 82 maintains the exit idler sheaves 79, 80 in axially spaced relationship. Exit conveyor belts 83, 84 are reeved around the exit conveyor drive and idler pulleys 71, 72, 79, 80 and trained along channel flanges extending between the sheaves and corresponding to the flanges 23–26. The exit conveyor belts 83, 84, like the supply conveyor belts 37, 38, straddle the delivery conveyor belt 59.

Referring to FIG. 2, a fragmentary portion of a processing machine turret is shown at 87. Vessels to be processed are transferred from delivery conveyor 13 to the turret 87 by a supply star wheel 88 at a processing machine supply station. Processed vessels are transferred from the turret 87 to the delivery conveyor 13 by an exit star wheel 89 at a processing machine exit station.

A variable pitch accelerating screw 92 is rotatively supported adjacent the supply and delivery conveyors 12, 13 at the supply transfer station. A variable pitch decelerating screw 93 is rotatively supported adjacent the delivery and exit conveyors at the exit transfer station. The screws 92, 93 are respectively connected to the processing machine by drives 95, 96. Thus, the same drive which causes rotation of the turret 87, causes rotation of the drives 95, 96 and their connected screws 92, 93 respectively, so that the speed of the two screws is coordinated to the rotational speed of the turret 87.

The supply, delivery and exit conveyor motors 45, 55, 68 are respectively connected to a common motor speed control 97 in the control cabinet 96. Thus a single adjustment of the control 97 will adjust the speed of the conveyors 12, 13, 14 so that their speeds are coordinated with the speeds of the turret 87 and the screws 92, 93.

OPERATION

In operation bottles 98 are transported by the supply conveyor 12 in aligned, juxtaposed relationship between supply conveyor guides 100. As the bottles 98 approach and pass the supply transfer station, the supply accelerating screw 92 accelerates the transport speed of the bottles and brings them into spaced relationship suitable for sequential engagement with the supply star wheel 88. The delivery conveyor is operated at a speed appropriate to maintain this spaced relationship and to synchronize the delivery of the now spaced bottles with the operation of the supply star wheel 88.

On completion of the vessel processing, the exit star wheel 89 transfers processed bottles onto the delivery conveyor. They are moved to the right as viewed in FIGS. 1 and 2 until they reach the decelerating screw 93. The processed bottles are slowed by the decelerating screw as they pass the exit transfer station and are then delivered to the exit conveyor in juxtaposed relationship. The bottles are then transported by the exit conveyor and guided by the exit guides 102 to the output end of the exit conveyor from whence they are removed for further processing.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

I claim:

1. For use with a vessel processing machine, an improved conveyor system comprising:
   a) a supply conveyor for supplying vessels along a supply path of travel for processing by such a machine;
   b) a delivery conveyor partially overlapping the supply conveyor along the path and otherwise downstream from the supply conveyor for receiving vessels from the supply conveyor and delivering such vessels to such machine;
   c) the delivery conveyor having a feed rate different than the feed rate of the supply conveyor, the feed rate of the delivery conveyor being substantially equal to a processing rate of such machine;
   d) the delivery conveyor being adapted to both deliver vessels to and receive exiting vessels from such machine;
   e) an exit conveyor partially overlapping the delivery conveyor along an exit path of travel downstream from the delivery conveyor for receiving processed vessels from the delivery conveyor and transporting such processed vessels at a feed rate appropriate for downstream processing;
   f) speed change means positioned near the conveyors only in the regions adjacent the overlapping portions of the conveyors for causing feed rate changes as vessels pass from the supply to the delivery conveyor and as processed vessels pass from the delivery to the exit conveyor the speed change means increasing the spacing between vessels as they pass from the supply to the delivery container when the machines is in use and decreasing the spacing of vessels as they pass from the delivery conveyor to the exit conveyor to reestablish essentially the same vessel spacing as the spacing on the supply conveyor; and
   g) guide rails cooperating with the speed change means to maintain vessels stabilized and upright and continuously laterally supported as they travel along the paths over the overlapping conveyor portions.

2. The conveyor system of claim 1 wherein the speed change means comprises a pair of variable pitch screws one of which is positioned at a transfer location between the supply and delivery conveyors and the other is positioned at a transfer location between the delivery and exit conveyors.

3. The system of claim 2 wherein the one screw is of increasing pitch and the other is of decreasing pitch in the direction of vessel travel.

4. The conveyor system of claim 1 wherein the feed rate of the delivery conveyor is faster than the feed rate of the supply and exit conveyors.

5. A conveyor system for supplying vessels to a machine for applying or removing bottle labels and for transporting vessels from such a machine for subsequent processing, the system comprising:
   a) a supply conveyor comprising:
      i) supply frame members connected together in spaced relationship;
      ii) an adjustable speed supply belt drive carried by the supply members at a location near one of an input and a transfer end, the supply belt drive including at least one supply belt engagement drive surface;
      iii) at least one supply idler carried by the supply members for rotation, at least one idler being near the other of the input and the transfer ends of the supply conveyor; and,
      iv) at least one supply conveyor belt reeved over said at least one supply drive surface and said at least one supply idler for transport of vessels from the input to the transfer end;
   b) an exit conveyor comprising:
      i) exit frame members connected together in spaced relationship;
      ii) an adjustable speed exit belt drive carried by the exit members at a location near one of a pickup and an output end of the exit conveyor, the exit belt drive including at least one exit belt engagement drive surface;
      iii) at least one exit idler carded by the exit members for rotation, the idler being near the other of the pickup and output ends of the exit conveyor; and,
      iv) at least one exit conveyor belt reeved over said at least one exit drive surface and said at least one exit idler for transport of vessels from the pickup to the output end;
   c) a delivery conveyor interposed between the supply and exit conveyors and mating with the supply and exit conveyors at supply and exit transfer stations, the delivery conveyor comprising:
      i) an adjustable speed delivery belt drive near one end of the delivery conveyor and, including at least one delivery belt engagement surface axially aligned with a selected one of the supply and exit idlers;
      ii) at least one rotatable delivery idler near another end of the delivery conveyor; and,
      iii) a delivery conveyor belt reeved around the delivery drive and the said at least one delivery idler for transport of vessels from the supply conveyor to such machine and from such machine to the exit conveyor.
   d) a vessel speed accelerating mechanism including a speed accelerating drive positioned near and spanning the supply transfer station for accelerating the speed of vessels as they are transferred at the supply transfer station from the supply to the delivery conveyor;

e) a vessel speed decelerating mechanism including a speed decelerating drive positioned near and spanning the exit transfer station for decelerating the speed of vessels as they are transferred from the delivery to the exit conveyor at the exit transfer station; and, f) drive speed control means operatively connected to the drives to coordinate their respective speeds whereby the delivery conveyor operates at bottle transport feed rates faster than the supply and exit conveyors and the speeds of the conveyors are coordinated with the speed of the machine.

6. The system of claim 5 wherein one of said at least one drive surfaces and one of said idlers are axially aligned and located near one of the transfer stations.

7. The system of claim 5 wherein the conveyors are longitudinally aligned.

8. The system of claim 5 wherein one conveyor having an end at one of the transfer stations includes at least two belts and the other conveyor having an end at said one transfer station includes a belt having an end section transversely disposed between said at least two belts.

9. The system of claim 5 wherein the drives are respectively at the input and pickup ends and said one end of the delivery conveyor is the delivery conveyor and nearest the supply conveyor.

10. The system of claim 5 further including guide structure connected to at least some of the conveyors and positioned to guide conveyed vessels and maintain them in upright orientations.

11. A conveyor system for supplying bottles to a machine for applying or removing bottle labels and for transporting bottles from such a machine for subsequent processing, the system comprising:

a) a supply conveyor comprising:
   i) supply frame structure delineating a path of bottle travel
   ii) an adjustable speed supply belt drive carried by the frame structure at a location near an input end, the supply belt drive including a spaced pair of supply belt engagement drive surfaces
   iii) a spaced pair of supply idlers carried by the frame structure for rotation about a common axis, the supply idlers being near a transfer end of the supply conveyor; and,
   iv) a spaced pair of supply conveyor belts respectively reeved over longitudinally aligned ones of the supply drive surfaces and supply idlers and supportively trained along the path for transport of bottles from the input to the transfer end;

b) an exit conveyor comprising:
   i) exit frame structure delineating a further path of travel
   ii) an adjustable speed exit belt drive carried by the exit frame structure at a location near a pickup end of the exit conveyor, the exit belt drive including a spaced pair of exit belt engagement drive surfaces
   iii) a spaced pair of exit idlers carried by the exit frame structure for rotation about a common axis, the idlers being respectively near an output end of the exit conveyor; and,
   iv) a spaced pair of exit conveyor belts respectively reeved over longitudinally aligned ones of the exit drive surfaces and exit idlers and supportively trained for transport of bottles from the pickup to the output end;

c) a delivery conveyor interposed between the supply and exit conveyors and mating with the supply and exit conveyors at supply and exit transfer stations, the delivery conveyor comprising:
   i) an adjustable speed delivery belt drive axially aligned with and interposed between the supply idlers;
   ii) a delivery idler axially aligned with and interposed between the exit drive surfaces; and,
   iii) a delivery conveyor belt reeved around the delivery drive and idler, the delivery belt being respectively interposed between the belts of the pairs of supply and exit conveyor belts;

d) a bottle speed accelerating mechanism positioned adjacent and spanning the supply transfer station for accelerating the speed of bottles as they are transferred from the supply to the delivery conveyor, e) a bottle speed decelerating mechanism positioned adjacent and spanning the exit transfer station for decelerating the speed of bottles as they are transferred from the delivery to the exit conveyor; and, f) drive speed control means operatively connected to the drives to coordinate their respective speeds whereby the transfer conveyor operates at bottle transport feed rates faster than the supply and exit conveyors and the speeds of the conveyors are coordinated with the speed of the machine.

12. The system of claim 11 wherein the conveyors are longitudinally aligned.

13. The system of claim 11 further including guide structure connected to at least some of the conveyors and positioned to guide conveyed vessels and maintain them in upright orientations.

14. The system of claim 11 wherein each of the supply and exit conveyor frame structures includes a pair of opposed channels.

* * * * *